US012780224B2

(12) United States Patent
Lange et al.

(10) Patent No.: US 12,780,224 B2
(45) Date of Patent: Nov. 3, 2026

(54) METHOD FOR EVALUATING SPATIALLY RESOLVED ACTUAL SENSOR DATA

(71) Applicant: Robert Bosch GmbH, Stuttgart (DE)

(72) Inventors: Oliver Lange, Hemmingen (DE); Michael David Warren, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 69 days.

(21) Appl. No.: 18/659,171

(22) Filed: May 9, 2024

(65) Prior Publication Data

US 2024/0383488 A1 Nov. 21, 2024

(30) Foreign Application Priority Data

May 17, 2023 (DE) ..................... 10 2023 204 610.5

(51) Int. Cl.
*B60W 50/02* (2012.01)
*B60W 60/00* (2020.01)

(52) U.S. Cl.
CPC ... *B60W 50/0205* (2013.01); *B60W 2050/021* (2013.01); *B60W 60/001* (2020.02)

(58) Field of Classification Search
CPC ........... B60W 50/0205; B60W 60/001; B60W 2050/021; G01C 21/1652; G01C 21/30
See application file for complete search history.

(56) References Cited

U.S. PATENT DOCUMENTS

| | | | | |
|---|---|---|---|---|
| 10,368,217 | B2 * | 7/2019 | Åström | H04W 4/023 |
| 11,237,005 | B2 * | 2/2022 | Gustafsson | G01S 19/49 |
| 12,351,187 | B2 * | 7/2025 | Gruenwedel | G01S 17/86 |
| 12,384,423 | B2 * | 8/2025 | Donderici | G01S 13/867 |
| 2018/0012370 | A1 * | 1/2018 | Aghamohammadi | G06F 18/251 |
| 2020/0369297 | A1 * | 11/2020 | Jeon | B60W 60/0017 |
| 2021/0190535 | A1 * | 6/2021 | Tomioka | G01C 21/3822 |
| 2021/0366154 | A1 * | 11/2021 | Lee | B60R 11/04 |
| 2023/0305829 | A1 * | 9/2023 | Bastien | G06F 11/3604 |
| 2024/0035832 | A1 * | 2/2024 | Rizk | G01C 21/3461 |

(Continued)

FOREIGN PATENT DOCUMENTS

| | | | |
|---|---|---|---|
| DE | 102016224212 | A1 | 6/2018 |
| DE | 102018104780 | A1 | 9/2019 |
| DE | 102018008685 | A1 | 5/2020 |

*Primary Examiner* — Christopher George Fees
(74) *Attorney, Agent, or Firm* — NORTON ROSE FULBRIGHT US LLP

(57) ABSTRACT

A method for evaluating spatially resolved actual sensor data recorded with at least one sensor. The actual sensor data are read first. A location and an orientation of the actual sensor data are ascertained. A spatially resolved map with spatially resolved expectations of sensor data is read. The spatially resolved expectations of the sensor data are compared to the actual sensor data. A property can be ascertained from the comparison. An estimation can take place as to what influence an error source has on the comparison of the spatially resolved expectations of the sensor data to the actual sensor data. It is determined whether or not the property is fulfilled, based on the comparison of the spatially resolved expectations of the sensor data to the actual sensor data and based on the estimation of the influence of the error source. The property and a property probability are output.

16 Claims, 3 Drawing Sheets

(56) References Cited

U.S. PATENT DOCUMENTS

| | | | | |
|---|---|---|---|---|
| 2024/0338916 | A1* | 10/2024 | Chandler | G06V 10/764 |
| 2024/0400045 | A1* | 12/2024 | Gochev | B60W 30/0956 |

* cited by examiner

METHOD FOR EVALUATING SPATIALLY RESOLVED ACTUAL SENSOR DATA

CROSS REFERENCE

The present application claims the benefit under 35 U.S.C. § 119 of German Patent Application No. DE 10 2023 204 610.5 filed on May 17, 2023, which is expressly incorporated herein by reference in its entirety.

FIELD

The present invention relates to a method for evaluating spatially resolved actual sensor data, to a method for controlling a movable object, and to a computing unit with which one of the methods or both methods can be carried out.

BACKGROUND INFORMATION

Driver assistance systems and systems for the at least partially automated driving of vehicles or robots are described in the related art. In these systems, the environment of the vehicle or robot is sensed with one or more sensors, and a plan of the future behavior of the vehicle or robot is ascertained therefrom. Neural networks are frequently used to ascertain such a plan, or an environmental representation as a pre-product for the plan. German Patent Application No. DE 10 2018 008 685 A1 describes a method for training a neural network for determining a path prediction for a vehicle.

It can be provided that spatially resolved actual sensor data are evaluated to check whether they are in line with an expectation. As a result, free areas, i.e., areas into which the vehicle or the robot is to be moved, can be ascertained more easily. However, such methods require a high resolution of the involved sensors so that the spatially resolved actual sensor data are sufficiently accurate to ascertain the free areas. In these methods, it can be provided to ascertain whether free areas can possibly include a hidden object.

SUMMARY

An object of the present invention is to provide an improved method for evaluating spatially resolved actual sensor data in which a lower sensor resolution can be used. A further object of the present invention is to provide a method for controlling a movable object that accesses the evaluated sensor data. A further object of the present invention is to provide a computing unit with which one of the methods or both methods can be carried out. A further object of the present invention is to specify a computer program for carrying out the method. These objects may be achieved by features of the present invention disclosed herein. Advantageous example embodiments and developments of the present invention are disclosed herein.

The present invention relates to a method for evaluating spatially resolved actual sensor data recorded with at least one sensor. According to an example embodiment of the present invention, in this case, the actual sensor data are read first. Furthermore, a location and an orientation of the actual sensor data are ascertained. They can each relate to a two-dimensional or a three-dimensional environment of the sensor. In particular, location and environment can include two- or three-dimensional vectors. In addition, a spatially resolved map with spatially resolved expectations of sensor data is read. The spatially resolved expectations of the sensor data can, for example, relate to a road space for a vehicle or to a movement area of a robot. Now, the spatially resolved expectations of the sensor data are compared to the actual sensor data and a property is ascertained from the comparison of the spatially resolved expectations of the sensor data and the actual sensor data. Furthermore, an estimation can take place as to what influence an error source has on the comparison of the spatially resolved expectations of the sensor data to the actual sensor data. On the basis of the comparison of the spatially resolved expectations of the sensor data to the actual sensor data, it is subsequently determined whether or not a property is fulfilled in a drivable area. Furthermore, an estimation of the influence of the error source takes place. Lastly, the property and a property probability are output.

According to an example embodiment of the present invention, the spatially resolved expectations of the sensor data can, in particular, include expectations of raw sensor data and/or expectations of processed sensor data. The actual sensor data can include raw actual sensor data and/or expectations of processed actual sensor data. The spatially resolved expectations of the sensor data can, for example, include which areas are drivable for the vehicle or the robot, i.e., free of other objects. However, it can also be provided that the spatially resolved expectations of the sensor data include where objects such as, for example, but not exclusively, walls, posts, traffic signs, signs, machines, holes, which are to be avoided by the vehicle or the robot, are arranged on a roadway. The property can, in particular, include whether the area is really drivable and/or whether the objects are really arranged at these locations.

The property probability can, in particular, include with what certainty the property is present. In particular, a percent probability with which the property applies can be specified with the property probability. This can, for example, include that a hidden object of a specified size is ruled out to one hundred percent in a particular area, and that there is only a residual probability for a smaller object.

In particular, according to an example embodiment of the present invention, it can be provided that it is determined with what probability no object is present in an area. Alternatively, it may be provided that it is indicated to what object size an object is ruled out in an area. It can, for example, be provided that it is ascertained and output that no object greater than a few centimeters is arranged in an area. This information can then optionally be taken into account in a movement plan.

According to an example embodiment of the present invention, it can be provided that more than one error source is evaluated in order to ascertain the influence of a plurality of error sources on the comparison of the spatially resolved expectations of the sensor data to the actual sensor data. Then, an even more accurate estimation of the influence of the error sources and an even more accurate determination of the property probability can take place.

According to an example embodiment of the present invention, it can be provided that the comparison of the spatially resolved expectations of the sensor data and the actual sensor data takes place on the basis of a spatially resolved three-dimensional geometry and/or a texturing and/or a reflectance amplitude and/or a multispectral response and/or a magnetic resonance. In this case, the sensor can comprise a camera. Alternatively, or additionally, the sensor can comprise a radar sensor and/or a LIDAR sensor.

In one example embodiment of the method of the present invention for evaluating spatially resolved actual sensor data, the error source includes a measurement inaccuracy of the sensor. The measurement inaccuracy of the sensor can be propagated through a signal path so that a statement can be made as to which areas are free and thus drivable and which areas are occupied and thus not drivable, and a measurement inaccuracy of the sensor is taken into account in the process.

In one example embodiment of the method of the present invention for evaluating spatially resolved actual sensor data, the error source includes a location and orientation inaccuracy of the actual sensor data. The location and orientation inaccuracy can be propagated through a signal path so that a statement can be made as to which areas are free and thus drivable and which areas are occupied and thus not drivable, and inaccuracies of the location determination and of the orientation determination are taken into account in the process.

In one example embodiment of the method of the present invention for evaluating spatially resolved actual sensor data, the error source includes a map data inaccuracy. This map data inaccuracy can also be propagated through a signal path so that a statement can be made as to which areas are free and thus drivable and which areas are occupied and thus not drivable, and the map data inaccuracy can be taken into account in the process.

In one example embodiment of the method of the present invention for evaluating spatially resolved actual sensor data, the determination of whether the property is fulfilled takes place on the basis of a residual of a possibly existing object, wherein the residual, including an error estimate, is compared to a threshold value. In particular, the property can be fulfilled if the residual, including an error estimate, is above the threshold value. This makes a simple mathematical implementation of the method according to the present invention possible.

In one example embodiment of the method of the present invention for evaluating spatially resolved actual sensor data, error limits are taken into account when estimating the influence of the error source. In particular, maximum values and minimum values for estimating the error can be used in each case. This likewise makes a simple mathematical implementation possible.

In one example embodiment of the method of the present invention for evaluating spatially resolved actual sensor data, the error limits are furthermore checked as to whether an adjustment of the error limits is required. For example, outliers can be detected or checked for a number of deviations.

In one example embodiment of the method of the present invention for evaluating spatially resolved actual sensor data, an uncertainty volume is considered for the actual sensor data, wherein a property linked to the actual sensor data is assumed for the entire uncertainty volume. The uncertainty volume can in this case be a representation of measured values of the actual sensor data, with which a simple estimation can be made.

The present invention also relates to a method for controlling a movable object. This method for controlling a movable object can, in particular, be based on the method according to the present invention for evaluating spatially resolved actual sensor data. In particular, the method for evaluating spatially resolved actual sensor data can be used to determine a property and a property probability, and the method for controlling the movable object can subsequently be carried out. In this case, a movement of the movable object is first planned on the basis of the properties, movement data are subsequently ascertained on the basis of the planned movement, and the movable object is then moved on the basis of the movement data.

The present invention furthermore relates to a computing unit for carrying out one of the methods according to the present invention. In this case, it can be provided that the computing unit carries out the method for evaluating spatially resolved actual sensor data and/or the method for controlling a movable object. In particular, it can be provided that the computing unit carries out both methods. The computing unit can, for example, be part of a control unit of the vehicle or part of a control unit of the robot.

The present invention furthermore relates to a computer program containing machine-readable instructions which, when executed on one or more computers, cause the computer(s) to perform the method according to the present invention. Such a computer program can also be stored on the computing unit.

The present invention furthermore relates to a machine-readable data carrier and/or download product with the computer program according to the present invention.

Embodiment examples of the present invention are explained with reference to the figures.

DETAILED DESCRIPTION OF EXAMPLE EMBODIMENTS

Figure 1:
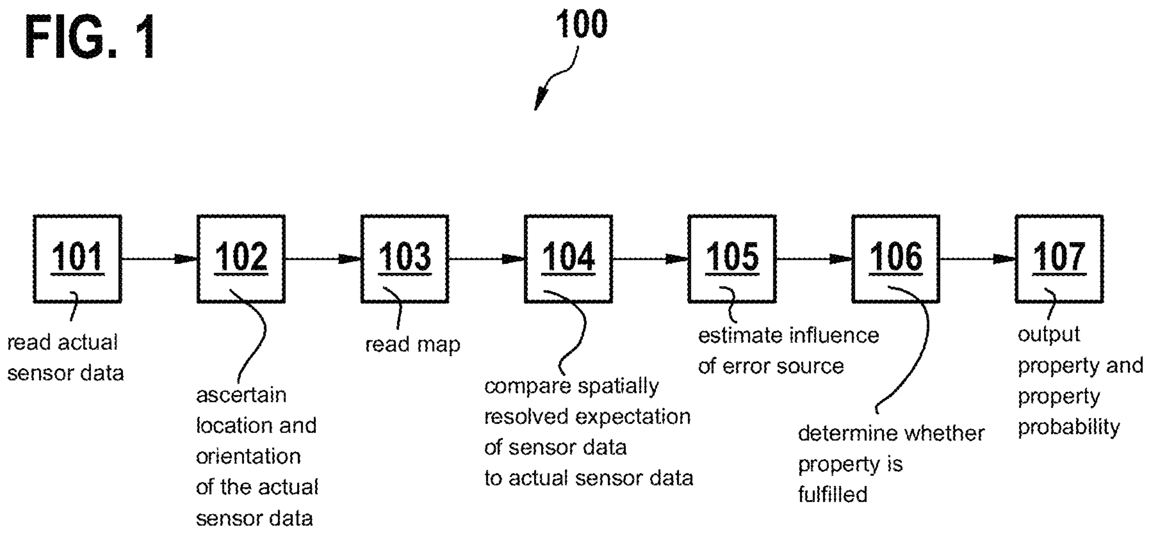
FIG. 1 shows a flowchart of a method for evaluating spatially resolved actual sensor data, according to an example embodiment of the present invention.

FIG. 1 shows a flowchart 100 of a method for evaluating spatially resolved actual sensor data recorded with at least one sensor. In a reading step 101, the actual sensor data are read. In an ascertainment step 102, a location and an orientation of the actual sensor data are ascertained. In a map reading step 103, a spatially resolved map with spatially resolved expectations of sensor data is read. The map reading step 103 can also be carried out before the reading step 101, or between the reading step 101 and the ascertainment step 102, and optionally also in parallel with the reading step 101 or ascertainment step 102. In a comparison step 104, the spatially resolved expectations of the sensor data are compared to the actual sensor data and a property is ascertained from the comparison of the spatially resolved expectations of the sensor data and the actual sensor data. In an estimation step 105, an influence of an error source on the comparison of the spatially resolved expectations of the sensor data to the actual sensor data is estimated. In a determination step 106, it is determined whether the property is fulfilled in a drivable area, on the basis of the comparison made in the comparison step 104 of the spatially resolved expectations of the sensor data to the actual sensor data and on the basis of the estimation made in the estimation step 106 of the influence of the error source. In an output step 107, the property and a property probability are output.

The property probability can, in particular, include with what certainty the property is present. In particular, a percent probability with which the property applies can be specified with the property probability. This can, for example, include that a hidden object of a specified size is ruled out to one hundred percent in a particular area, and that there is only a residual probability for a smaller object. The property probability can be ascertained in particular in the determination step 106.

Figure 2:
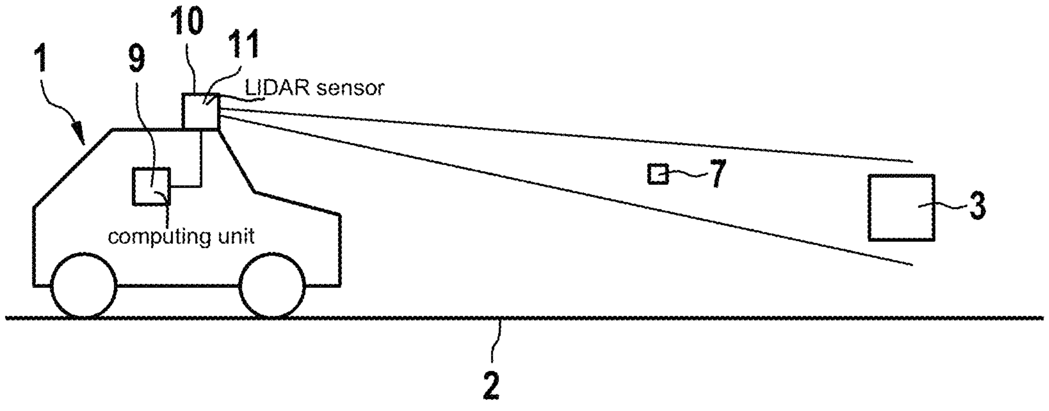
FIG. 2 shows a vehicle with a sensor, according to an example embodiment of the present invention.

FIG. 2 shows a vehicle 1 with a sensor 10 on a roadway 2. The sensor 10 can, for example, be a LIDAR sensor 11. By means of the LIDAR sensor 11, the roadway 2 can be scanned and it can be determined whether the roadway 2 is free so that the vehicle 1 can optionally be moved on the roadway 2 or in particular on free areas of the roadway 2. By means of the sensor 10, an object 3 on or above the roadway 2 can be detected, for example. In particular, it can be provided here to check, on the basis of a map read in the map reading step 103, whether an object 3 is always present at the location where the object 3 was ascertained, for example a building or a tree, or whether the object 3 is temporarily arranged at this location, for example in the form of a further vehicle parked there. Drivable areas can, in particular, be the parts of the roadway 2 into which the vehicle 1 can be moved.

The vehicle 1 furthermore comprises a computing unit 9 connected to the sensor 10. The computing unit 9 can serve to carry out the method according to the present invention of FIG. 1. The computing unit 9 can furthermore be configured to carry out a method for controlling the vehicle 1, which is explained below. In particular, it can be provided that the computing unit 9 carries out both methods. The computing unit 9 can, for example, be part of a control unit of the vehicle 1.

Figure 3:
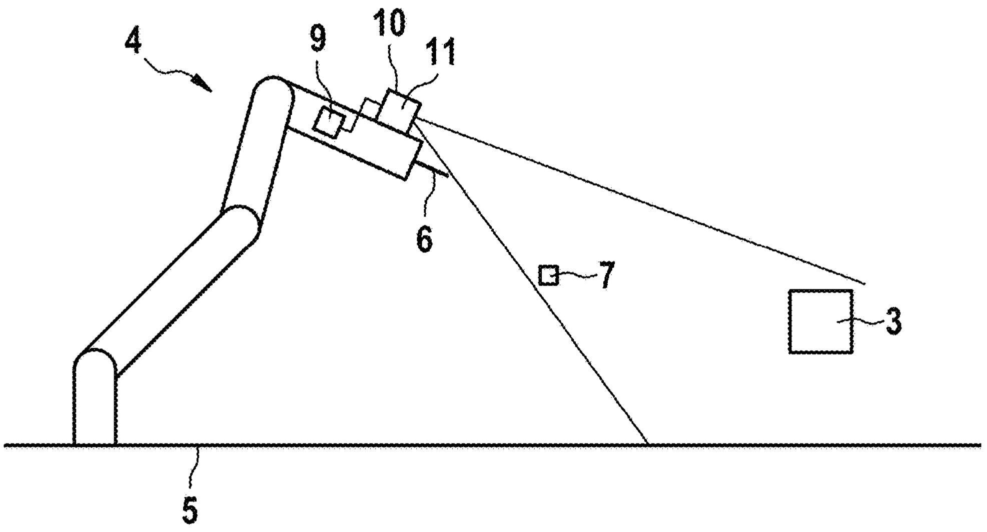
FIG. 3 shows a robot with a sensor, according to an example embodiment of the present invention.

FIG. 3 shows a robot 4 with a sensor 10. The sensor 10 can, for example, be a LIDAR sensor 11. By means of the LIDAR sensor 11, a movement area 5 can be scanned and it can be determined whether the movement area 5 is free so that the robot 4, or in particular, for example, a tool 6 of the robot 4, can optionally be moved into the movement area 5. Here, too, an object 3 can be determined by means of the sensor 10 and a movement of the robot 4 can optionally be planned such that the tool 6 does not move toward the object 3. Drivable areas can, in particular, be the parts of the movement area 5 into which the robot 4 can be moved.

Furthermore, a computing unit 9 is connected to the sensor 10. The computing unit 9 can serve to carry out the method according to the present invention of FIG. 1. The computing unit 9 can furthermore be configured to carry out a method for controlling the robot 4, which is explained below. In particular, it can be provided that the computing unit 9 carries out both methods. The computing unit 9 can, for example, be part of a control unit of the robot 4.

It can, in particular, be problematic in the embodiment examples of FIGS. 2 and 3 if a hidden object 7 is present and is overlooked by the sensor 10 since, in this case, a movement in this area possibly results in a collision. The method explained in connection with FIG. 1 can, in particular, use the property probability to specify a probability with which a particular area is free of a hidden object of a specified size. In particular, it can thus be provided that it is determined with which probability no object is present in a drivable area. Alternatively, it may be provided that it is indicated to what object size an object is ruled out in a drivable area. It can, for example, be provided that it is ascertained and output that no object greater than a few centimeters is arranged in a drivable area. This information can then optionally be taken into account in a movement plan.

It can be provided that the comparison of the spatially resolved expectations of the sensor data and the actual sensor data takes place on the basis of a spatially resolved three-dimensional geometry and/or a texturing and/or a reflectance amplitude and/or a multispectral response and/or a magnetic resonance.

The sensor 10 can comprise a LIDAR sensor 11, as shown in FIGS. 2 and 3. Alternatively, or additionally, the sensor 10 can comprise a radar sensor and/or a camera.

Figure 4:
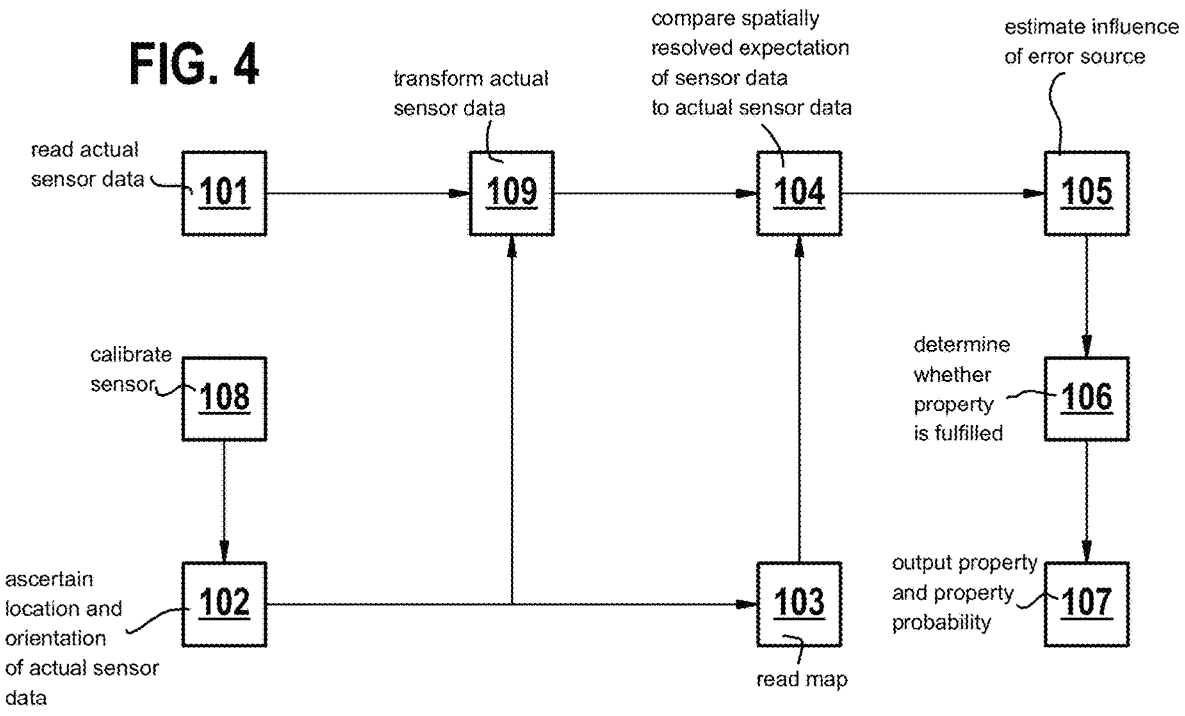
FIG. 4 shows a flowchart of a further method for evaluating spatially resolved actual sensor data, according to an example embodiment of the present invention.

FIG. 4 shows a flowchart 100 of a further method for evaluating spatially resolved actual sensor data, in which the method steps already described in FIG. 1 are denoted by the same reference signs. Additionally, a calibration step 108 is performed, in which the sensor 10 can be calibrated. After the calibration step 108, the ascertainment step 102 is carried out. Furthermore, a transformation step 109 can be carried out, in which the actual sensor data are transformed on the basis of the location ascertained in the ascertainment step 102 and on the basis of the orientation, ascertained in the ascertainment step 102, of the sensor.

In one embodiment example, the error source includes a measurement inaccuracy of the sensor. This measurement inaccuracy can be ascertained in the reading step 101 or on the basis of the actual sensor data read in the reading step 101. This can, for example, take place by specifying a measurement data uncertainty for each value of the actual sensor data.

In one embodiment example, the error source includes a location and orientation inaccuracy of the actual sensor data. The location and orientation inaccuracy of the actual sensor data can be ascertained in the ascertainment step 102 or on the basis of the location processed in the ascertainment step 102 and on the basis of the orientation processed in the ascertainment step 102. This can, for example, take place by specifying a location uncertainty for the location and also an orientation uncertainty for the orientation.

In one embodiment example, the error source includes a map data inaccuracy. This map data inaccuracy can be ascertained in the map reading step 103 or on the basis of the map read in the map reading step 103. The map data inaccuracy can, for example, comprise an uncertainty of a position of an object included in the map.

In one embodiment example, the determination as to whether the property is fulfilled takes place on the basis of a residual of a possibly existing object. The residual can then be compared to a threshold value. This can, for example, take place such that a residual of the object is ascertained in the comparison step 104, optionally using the described error sources, and the presence of the object is subsequently estimated in the estimation step 105 if the residual, optionally including an error estimate based on the error sources, is above a threshold value.

The error estimation can, in particular, include that intervals are specified for each error source and the error limits of the intervals are used to estimate a total error. In such an embodiment example, error limits are thus taken into account when estimating the influence of the error source.

In one embodiment example, the error limits are furthermore checked as to whether an adjustment of the error limits is required. This can, for example, be used for outlier detection or for a check for a number of deviations. The outlier detection can include that the actual sensor data are assessed on the basis of assumptions regarding a smoothness and/or a temporal consistency and/or a spatial consistency.

In one embodiment example, it is furthermore checked whether a plurality of the measured values or of the actual sensor data matches the map data. An upper limit for the influences of the error sources can thereby be estimated.

Figure 5:
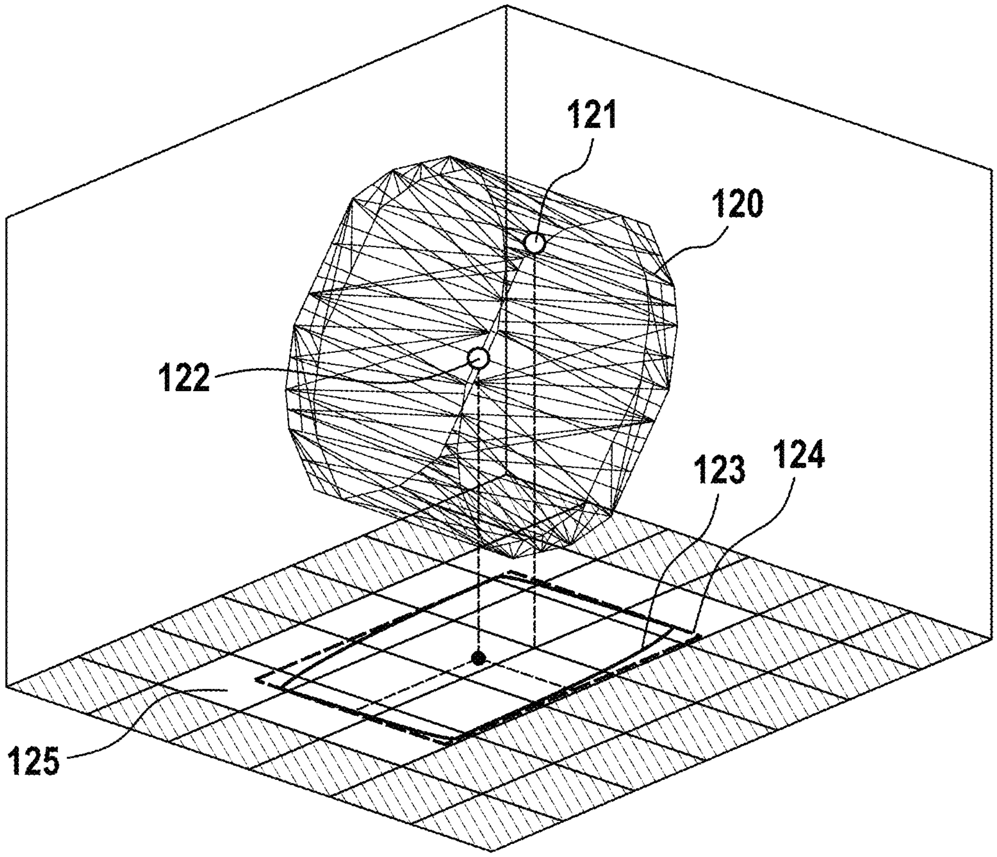
FIG. 5 shows an uncertainty volume.

FIG. 5 shows an uncertainty volume 120, which links a physical object point 121 to a measured object point 122 from the actual sensor data. The uncertainty volume 120 results from the error sources and the consideration of how these error sources can influence the actual sensor data. The uncertainty volume 120 can then be projected onto a surface so that a projection 123 of the uncertainty volume 120 results. Furthermore, a rectangle estimation 124 of the projection 123 can take place. The projection 123 or the rectangle estimation 124 of the projection 123 allows estimating which grid cells 125 are affected by the measured object point 122, i.e., for which grid cells the object must be assumed.

In one embodiment example, an uncertainty volume 120 is considered for the actual sensor data, wherein a property linked to the actual sensor data is assumed for the entire uncertainty volume 120. The linked property can be the presence of the object described with the measured object point 122.

Figure 6:
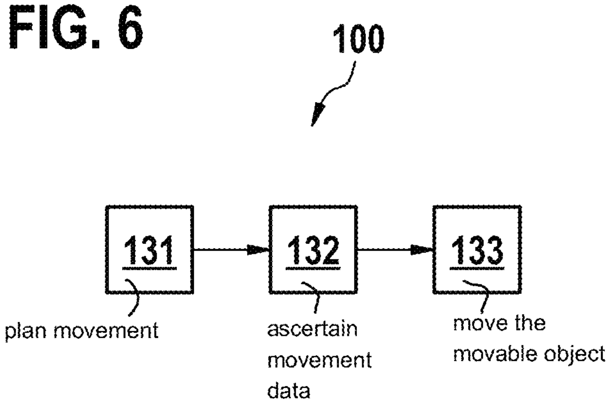
FIG. 6 shows a flowchart of a method for controlling a movable object, according to an example embodiment of the present invention.

FIG. 6 shows a flowchart 100 of a method for controlling a movable object, for example the vehicle 1 or the robot 4. This method for controlling a movable object can, in particular, be based on the method for evaluating spatially resolved actual sensor data as explained in connection with FIG. 1 to 5. In particular, properties and property probabilities ascertained with the method for evaluating spatially resolved actual sensor data can be used in the method for controlling a movable object. First, a movement of the movable object is planned on the basis of the properties in a planning step 131. In this case, it can, in particular, be provided that property probabilities for the drivable areas are also considered. For example, it can be taken into account for which areas a hidden object 7 with a minimum size can be ruled out with a probability above a specified threshold value, which can, for example, also be 99 or 100 percent. Subsequently, movement data are ascertained on the basis of the planned movement in a movement data ascertainment step 132 and the movable object is moved on the basis of the movement data in a movement step 133. It is thus possible to be able to control movements of the vehicle 1 or of the robot 4. The computing unit 9 shown in FIGS. 2 and 3 can also be configured for carrying out this method.

The present invention furthermore relates to a computing unit 9 for carrying out one of the methods according to the present invention. It can be provided that the computing unit 9 carries out the method for evaluating spatially resolved actual sensor data and/or the method for controlling a movable object. In particular, it can be provided that the computing unit 9 carries out both methods. The computing unit can, for example, be part of a control unit of the vehicle 1 or part of a control unit of the robot 4.

The present invention furthermore relates to a computer program containing machine-readable instructions which, when executed on one or more computers, cause the computer(s) to perform the method according to the present invention. Such a computer program can also be stored on the computing unit 9.

The present invention furthermore relates to a machine-readable data carrier and/or download product with the computer program according to the present invention.

Although the present invention has been described in detail by means of the preferred embodiment examples, the present invention is not limited to the disclosed examples and other variations may be derived therefrom by a person skilled in the art without departing from the scope of protection of the present invention.

What is claimed is:

1. A computer-implemented method for a machine equipped with at least one sensor, the method comprising the following steps:

reading actual sensor data recorded by the at least one sensor;

ascertaining a location and an orientation associated with the actual sensor data;

reading a spatially resolved map comprising, for respective spatial locations of a candidate drivable area of an environment surrounding the at least one sensor, predicted values that characterize raw sensor data expected to be returned by the at least one sensor at the respective location;

comparing, for each of a plurality of the spatial locations, the predicted values from the map with corresponding actual values of the actual sensor data to obtain at least one difference value in the form of a residual value representing deviation between expected and actual sensor data for the candidate drivable area;

estimating, for each of a plurality of potential error sources, a respective contribution of the respective potential error source to the residual value as a source of the deviation between the expected and actual sensor data, wherein the plurality of potential error sources comprise (i) a measurement uncertainty assigned to values of the actual sensor data, (ii) a pose uncertainty including a location uncertainty and an orientation uncertainty associated with the ascertained location and orientation, and (iii) a map data inaccuracy including an uncertainty of a position, in the spatially resolved map, of an object represented in the spatially resolved map, wherein the respective contributions are estimated as contributions of the measurement uncertainty, the pose uncertainty, and the map-data inaccuracy to the deviation between the predicted values from the map and the corresponding actual values of the actual sensor data;

determining, based on both (i) the at least one difference value in the form of the residual value and (ii) the plurality of estimated contributions of the potential error sources to the residual value:

(I) whether the at least one difference value in the form of the residual value is indicative of fulfillment of a predefined environmental characterization that the candidate drivable area is free of an object having at least a predefined minimum size; and (II) a probability of such fulfillment of the predefined environmental characterization; and controlling a movement or operation of the machine based on (a) whether the predefined environmental characterization is determined to be fulfilled and (b) the determined probability of such fulfillment.

2. The method according to claim 1, wherein the determination of whether the predefined environmental characterization is fulfilled and the probability of the fulfillment includes comparing residual value, together with the plurality of estimated contributions of the potential error sources to the residual value, to a threshold value.

3. The method according to claim 1, wherein error limits are taken into account when estimating the respective contribution of the respective potential error source to obtaining the residual value.

4. The method according to claim 3, wherein the error limits are checked to determine whether an adjustment of the error limits is required.

5. The method according to claim 1, wherein an uncertainty volume resulting from one or more of the potential error sources is considered for the actual sensor data, and wherein an object corresponding to the residual value is treated as potentially present throughout the entire uncertainty volume for determining whether the candidate drivable area is free of an object having at least the predefined minimum size.

6. The method according to claim 1, wherein fulfillment of the predefined environmental characterization is used to characterize the candidate drivable area as drivable.

7. The method according to claim 1, wherein during real-time operation of the machine, which includes continuous real-time determination of a state of the environment based on the actual sensor data, respective abilities of the measurement uncertainty, the pose uncertainty, and the map-data inaccuracy to contribute to the residual value as sources of the deviation between the expected and actual sensor data are continuously evaluated to account for respective changes in the respective abilities occurring over time, and the continuously evaluated abilities are used for the estimating of the respective contributions.

8. The method according to claim 1, wherein the comparing of the predicted values from the map with the corresponding actual values of the actual sensor data takes place based on at least one of a spatially resolved three-dimensional geometry, a texturing, a reflectance amplitude, a multispectral response, and a magnetic resonance.

9. The method according to claim 1, further comprising calibrating the at least one sensor and transforming the actual sensor data based on the ascertained location and the ascertained orientation before comparing the predicted values from the map with the corresponding actual values of the actual sensor data.

10. The method according to claim 1, wherein estimating the respective contributions comprises determining:
- how the measurement uncertainty contributes to the residual value by affecting a reliability of the corresponding actual values of the actual sensor data;
- how the pose uncertainty contributes to the residual value by affecting an association of the corresponding actual values of the actual sensor data with the respective spatial locations of the candidate drivable area; and
- how the map-data inaccuracy contributes to the residual value by affecting a reliability of the predicted values from the spatially resolved map.

11. The method according to claim 1, wherein it is checked whether a plurality of measured values of the actual sensor data matches map data of the spatially resolved map, and wherein an upper limit for the respective contributions of the potential error sources is estimated based on the checking.

12. The method according to claim 1, wherein error limits are used for estimating the respective contributions of the potential error sources, and wherein the error limits include maximum values and minimum values for estimating error.

13. The method according to claim 1, wherein an uncertainty volume links a physical object point to a measured object point from the actual sensor data, and wherein a projection of the uncertainty volume is used to estimate which grid cells are affected by the measured object point.

14. The method according to claim 1, wherein controlling the movement or operation of the machine comprises planning movement of the machine based on the determined probability, including taking into account an area for which a hidden object having the predefined minimum size is ruled out with a probability above a specified threshold value.

15. A computing unit of a machine that is equipped with at least one sensor, the computing unit comprising a processor system that includes at least one processor, wherein the processor system is configured to:
- read actual sensor data recorded by the at least one sensor;
- ascertain a location and an orientation associated with the actual sensor data;
- read a spatially resolved map comprising, for respective spatial locations of a candidate drivable area of an environment surrounding the at least one sensor, predicted values that characterize raw sensor data expected to be returned by the at least one sensor at the respective location;
- compare, for each of a plurality of the spatial locations, the predicted values from the map with corresponding actual values of the actual sensor data to obtain at least one difference value in the form of a residual value representing deviation between expected and actual sensor data for the candidate drivable area;
- estimate, for each of a plurality of potential error sources, a respective contribution of the respective potential error source to the residual value as a source of the deviation between the expected and actual sensor data, wherein the plurality of potential error sources comprise (i) a measurement uncertainty assigned to values of the actual sensor data, (ii) a pose uncertainty including a location uncertainty and an orientation uncertainty associated with the ascertained location and orientation, and (iii) a map data inaccuracy including an uncertainty of a position, in the spatially resolved map, of an object represented in the spatially resolved map, wherein the respective contributions are estimated as contributions of the measurement uncertainty, the pose uncertainty, and the map-data inaccuracy to the deviation between the predicted values from the map and the corresponding actual values of the actual sensor data;
- determine, based on both (i) the at least one difference value in the form of the residual value and (ii) the plurality of estimated contributions of the potential error sources to the residual value:
  - (I) whether the at least one difference value in the form of the residual value is indicative of fulfillment of a predefined environmental characterization that the candidate drivable area is free of an object having at least a predefined minimum size; and
  - (II) a probability of such fulfillment of the predefined environmental characterization; and
- control a movement or operation of the machine based on (a) whether the predefined environmental characterization is determined to be fulfilled and (b) the determined probability of such fulfillment.

16. A non-transitory machine-readable data carrier on which is stored a computer program for a machine equipped with at least one sensor, the computer program being executable by one or more computers and, when executed by the one or more computers, causing the one or more computers to perform the following steps:
- reading actual sensor data recorded by the at least one sensor;
- ascertaining a location and an orientation associated with the actual sensor data;
- reading a spatially resolved map comprising, for respective spatial locations of a candidate drivable area of an environment surrounding the at least one sensor, predicted values that characterize raw sensor data expected to be returned by the at least one sensor at the respective location;

comparing, for each of a plurality of the spatial locations, the predicted values from the map with corresponding actual values of the actual sensor data to obtain at least one difference value in the form of a residual value representing deviation between expected and actual sensor data for the candidate drivable area;

estimating, for each of a plurality of potential error sources, a respective contribution of the respective potential error source to the residual value as a source of the deviation between the expected and actual sensor data, wherein the plurality of potential error sources comprise (i) a measurement uncertainty assigned to values of the actual sensor data, (ii) a pose uncertainty including a location uncertainty and an orientation uncertainty associated with the ascertained location and orientation, and (iii) a map data inaccuracy including an uncertainty of a position, in the spatially resolved map, of an object represented in the spatially resolved map, wherein the respective contributions are estimated as contributions of the measurement uncertainty, the pose uncertainty, and the map-data inaccuracy to the deviation between the predicted values from the map and the corresponding actual values of the actual sensor data;

determining, based on both (i) the at least one difference value in the form of the residual value and (ii) the plurality of estimated contributions of the potential error sources to the residual value:

(I) whether the at least one difference value in the form of the residual value is indicative of fulfillment of a predefined environmental characterization that the candidate drivable area is free of an object having at least a predefined minimum size; and (II) a probability of such fulfillment of the predefined environmental characterization; and controlling a movement or operation of the machine based on (a) whether the predefined environmental characterization is determined to be fulfilled and (b) the determined probability of such fulfillment.

* * * * *